United States Patent [19]

Thompson

[11] Patent Number: 4,822,379
[45] Date of Patent: Apr. 18, 1989

[54] SOLID FUEL COMPOSITION FROM WASTE PRODUCTS

[76] Inventor: Jeffery Thompson, 3059 Old Stone Dr., Birmingham, Ala. 35243

[21] Appl. No.: 23,800

[22] Filed: Mar. 9, 1987

Related U.S. Application Data

[63] Continuation-in-part of Ser. No. 873,170, Jun. 10, 1986, abandoned.

[51] Int. Cl.$^4$ ............................ C10L 5/06; C10L 5/00
[52] U.S. Cl. ........................................ 44/589; 44/605; 44/628
[58] Field of Search ............. 44/1 R, 1 D, 1 A, 10 A, 44/589, 605, 628

[56] References Cited

U.S. PATENT DOCUMENTS

| | | | |
|---|---|---|---|
| 2,402,947 | 7/1946 | Burch | 44/628 |
| 4,102,277 | 7/1978 | Wall | 44/1 D |
| 4,259,085 | 3/1981 | Ban et al. | 44/1 R |

FOREIGN PATENT DOCUMENTS

| | | | |
|---|---|---|---|
| 1187021 | 5/1985 | Canada | 44/1 D |
| 3309911 | 9/1984 | Fed. Rep. of Germany | 44/605 |
| 3440612 | 5/1986 | Fed. Rep. of Germany | 44/1 D |
| 122896 | 9/1981 | Japan | 44/589 |
| 38894 | 3/1982 | Japan | 44/1 D |

*Primary Examiner*—Carl F. Dees
*Attorney, Agent, or Firm*—Cushman, Darby & Cushman

[57] ABSTRACT

A solid fuel comprised of waste materials and a method of using the same are disclosed. The composition is made up of a heating value component, a neutralizing component and a nuisance waste component. Each of these components is a material which is readily available as a waste. Each component may be either solid or liquid, however, the total composition may not be more than 40% liquid. The nuisance waste component is a compound or mixture of compounds which often present disposal problems for industry. The nuisance wastes may include chlorinated hydrocarbons such as polychlorinated biphenyls, sulfur containing compounds, biological wastes and/or metals which are converted to stable and more easily disposed of compounds as the fuel briquette is burned in a kiln or furnace so that an inexpensive fuel is created from the waste products.

9 Claims, No Drawings

SOLID FUEL COMPOSITION FROM WASTE PRODUCTS

RELATED APPLICATIONS

This invention relates to and is a continuation-in-part of my previous application Ser. No. 873,170, filed June 10, 1986 (now abandoned), titled New Design For Lime Kilns, the complete disclosure of which is hereby fully and expressly incorporated by reference and relied upon.

BACKGROUND OF THE INVENTION

The cost of fuels used for high temperature lime kilns has increased substantially over recent years. Once a nominal constituent of the final product price, fuel costs have become a substantial component of the cost of producing lime.

Additionally, lime manufacturers are faced with finding clean-burning fuels in order to minimize the complexity of building and operating off gas scrubbing pollution control equipment. It is well known that fuels such as oils and coal contain relatively high levels of sulfur. Additionally, if low grade (and therefore low cost) fuels are used, other contaminants such as metals like lead and chromium may be present. Producers must therefore strike a balance between fuel costs and pollution control costs.

It is also well known that industry generally is now subject to strict environmental laws controlling the handling and disposal of solid and liquid wastes which are considered noxious or are "listed" by regulating agencies. Wastes such as fluorine or chlorine containing hydrocarbons, hydrocarbon solvents, paints, sewage effluents and the like must generally be stabilized, packaged and transported to land fill facilities. These increasingly stringent laws may soon eliminate the possibility of disposing certain toxics or listed substances in land fills at all. Certain wastes which are not so listed may be disposal problems as well.

As used in the present application, the term "listed" refers to certain compounds which are set forth in U.S. environmental laws, for example the Resource Conservation and Recovery Act and U.S. Environmental Protection Agency regulations which require special handling and disposal because of the properties of these compounds, at certain concentrations, are hazardous to human health. As indicated below, stringent handling requirements imposed by these regulations can only be avoided by reacting the hazardous compounds so as to convert them to non-hazardous forms.

For the purpose of determining which chemical compounds are "listed" wastes as discussed herein, the provisions of the Resource Conservation and Recovery Act and the U.S.E.P.A. regulations are expressly incorporated by reference herein, and relied upon.

In light of these problems, the present invention relates to a composition made from waste products readily available from the waste disposal industry, which composition can contain certain of these listed materials or other nuisance waste materials but which, when compressed to a shaped solid and burned under controled conditions these materials are converted to innocuous compounds which are easily disposed of. The briquetted composition retains its structure during combustion so as to minimize formation of aerosol fly ash and capture volatilized sulfur, chlorine, fluorine and metal compounds which would otherwise escape. Since the composition is made from waste components which are available at very low or no cost, the briquetted composition can provide heat for a lime kiln, or other high temperature process, at very low cost. In fact, revenue may be realized by destroying the wastes.

BACKGROUND ART

Solid fuels formed from various low cost wastes are generally known. For example, U.S. Pat. No. 4,596,584 describes a solid fuel made from waste paper and an oil product such as fuel oil, waste oil, coke in slurry or solid form, refinery bottoms or vegetable oil. The combined components are pelletized. A binding agent and water may also form part of the fuel.

In U.S. Pat. No. 4,496,365 a method of producing a pelletized fuel from garbage, sludge or other waste materials is disclosed. The mixture consists of refuse or garbage, coal fines and lime, and is briquetted at high pressures so as to result in thermic sterilization.

Another patent, U.S. Pat. No. 4,356,000 describes a fuel derived from thick tarry and/or oily wastes in which such waste is mixed with water, finely divided aluminum silicate derived from fly ash, and cement. The oil component of the fuel mixture of U.S. Pat. No. 4,356,000 may include phenolically contaminated liquid and waste waters, waste polyvinyl alcohol liquids and sludges, waste organic paints, sewage effluents, digested and other sewage sludges and phenol formaldehyde resin liquid aqueous wastes. In this instance, the mixture of fuel components sets into a low strength solid which is subsequently powdered. The final product has a calorific value of approximately 4700 BTU per lb.

While these references generally teach the use of waste products in a fuel composition, they do not address the specific problem solved by the present invention. While the use of waste coal and oil, in combination with various other components such as cement, water or organic wastes, is known to generally provide fuels of sufficient heating value, these references do not address the problems which arise as a result of the inclusion of sulfur containing compounds, fluorine or chlorine containing hydrocarbons, biological, biochemical wastes and/or metals in the waste components of these fuels, and the problem of neutralizing and retaining such waste compounds within a fuel briquette during combustion. Necessary combustion conditions are not described.

SUMMARY OF THE INVENTION

In its most preferred embodiment the present inventive composition is made up of a heating value component, a nuisance waste component and a neutralizing component. It should be noted, however, that the heating value component can, in and of itself, contain the nuisance waste component, for example when sulfur containing fuels are used. The composition is shaped to a solid fuel and subjected to combustion conditions in order to obtain the heating value therefrom while at the same time converting noxious or undesirable (because of disposal problems) waste to a more easily disposed of material.

Any of the components can be either liquid or solid providing that the overall composition of the fuel briquette is 40% or less liquid by weight, and the overall composition has a net heating value greater than 200 btu/lb.

The neutralizing component can contain Mg, Ca or Na oxides, hydroxides and carbonates as the essential ingredients of waste materials such as lime fines, lime kiln baghouse dust, cement kiln dust, calcium carbonate sludges from paper mills, BOF dust, etc. Usually this component will be CaO or Ca(OH)2, alone or in mixtures with NaOH.

The nuisance waste component can be any material that is contaminated with a "listed" or non-listed substance such that the concentration of the noxious contaminant is too high to dispose of the material in a ordinary landfill, but the concentration of the contaminant is too low to make recovery or use of the contaminating substance economically viable. For example, certain waste waters from plating operations contain chrome as $Cr^{+6}$ but at such low concentrations the recovery of the chrome is uneconomical, yet the water contains too much chrome to discharge it into ordinary sewers.

Another example is the scrubber liquor from painting operations where the paint hood exhaust air system includes a scrubber to control emissions of paint and paint solvent substances to the atmosphere. The liquid, water, contains too much organic material or hydrocarbon to allow it to be discharged into a sewer, but too little hydrocarbon to make the recovery of the solvents economically viable, or to be useful as a fuel. Yet another example is that of dirt contaminated with chemical spills. In many instances hundreds or thousands of tons of dirt must be carried to a disposal site because the dirt has been contaminated with small amounts of hazardous substances. The level of contamination is too low to make recovery or utility of the contaminated material economically plausible, but the contamination is too high to allow ordinary disposal. This novel fuel composition allows for combining these three catagories of materials (fuel, neutralizer, and nuisance waste), so that the mixture can be formed into a shaped solid and advantageously used as a fuel in, for example, a lime kiln.

Importantly, however, even wastes which are not "listed", but which are problem wastes for industry can be used as the nuisance waste component of the invention, for example certain biological wastes.

It has been found that the composition should be shaped at a pressure which provides structural integrity to the shaped solid product and intimately contacts the components within the solid. Pressures of from about 1000 to 25,000 psi (preferably 6000–8000 psi) are used. After shaping, the solid fuel is then subjected to combustion conditions adequate to cause the nuisance wastes therein to react and recombine with the materials comprising the neutralizing portion of the mixture. Although these conditions can vary widely depending on the materials in the mixture, it is generally preferred that the solid fuel be burned for more than about 30 minutes at from about 1150 to about 1300° C. in order for the nuisance waste components of the fuel to be substantially converted to non-listed or innocuous compounds. Times and temperatures will, however, depend on the nature of waste, and what is necessary to convert waste components to innocuous and easily diposed of forms. Usually combustion of the solid fuel will be for a period such that the full heating value of the briquette can be used to heat a kiln or furnace such as a lime kiln.

PREFERRED EMBODIMENT AND DETAILED DESCRIPTION OF THE INVENTION

The present invention is a fuel composition which comprises a heating value component (usually coke or coal waste), a neutralizing component (usually waste lime, limestone and sodium hydroxide), and a nuisance waste component which contains compounds such as polychlorinated biphenyls (PCBs), sulfur containing compounds and/or metals such as lead, chromium, cadmium and zinc. Biological wastes may also be used. These materials may be readily obtained from the waste disposal industry and there is great incentive to provide a useful and inexpensive manner of disposing of them.

Surprisingly, the waste component of the solid fuel composition can consist of, inter alia, various waste oils or solids which are contaminated with, for example, polychlorinated biphenyls (PCBs), sulfur and metals. The fuel provides a convenient and low cost fuel source in which wastes like chlorine from PCBs, sulfur and metals are retained within the solid fuel structure as solid reaction products formed at high temperatures so as to minimize the possibility of these compounds exiting with combustion off-gases. The unique composition of the solid fuel encourages reactions between the components, resulting in the formation of stable materials as the fuel is burned. The materials formed in the solid reaction product are generally not water soluble which makes disposal in ordinary landfills possible.

The fuel can also use biological wastes such as sewage sludge, animal remains, tissue and other medical refuse, and bio-chemical wastes from laboratories. Naturally, such low grade fuels and wastes may be obtained at a very low cost, or a revenue may actually be realized by destroying the wastes.

The preferred composition has at most 40% by weight liquid. This liquid may be a fuel material or contain fuel materials or it may have no net calorific value. There is no chemical reason to limit the liquid constituent to 40% or less, however, a pressed briquette comprised of more liquid has been found to lack the integrity necessary for handling and stockpiling.

Alkaline compounds can be used in the neutralizing component, for example NaOH, Ca(OH)2, Mg(OH)2, or their oxides or carbonates.

Where sodium hydroxide is used in the neutralizing component, it will normally be present in a quantity determined by the amount of chlorine or fluorine in the nuisance waste. "Red mud" is a disposal or waste slurry product of alumina extraction from bauxite and is an excellent and inexpensive source of sodium hydroxide. The red mud used in the invention is a 10–20% solid containing slurry made up of alumina ($Al_2O_3$) and its hydrates as well as minor components of $Fe_2O_3$, $SiO_2$, $CaCO_3$, $MgCO_3$, and water saturated with NaOH. Preferably, from 1–20% red mud slurry is used, and more preferably 6–15% by weight of the slurry is used. Amounts over 25% red mud slurry make the ash material sticky at high temperature and the briquette is weak when produced.

It has been found that as the fuel briquette of the invention is heated, the sodium hydroxide contained in the "red mud" melts and, in conjunction with calcium hydroxide (from the limestone contained in the neutralizing component), forms a two phase medium into which $Cl_2$ and $F_2$ gases from the decomposition and combustion of chlorinated or fluorinated organic materials is readily absorbed. Likewise sulfur compounds which may be present either in the heating value component or the waste component, usually in the form of sulfide or sulfate, are absorbed. When chlorine, fluorine and sulfur containing wastes are used in the composition, capture of such compounds is maximized by having the combined calcium (from the hydrate) and sodium (from the red mud) add up to two times or more than the molar composition of chlorine, fluorine and sulfur in the fuel materials.

The lime for the neutralizing component of the invention may come from limestone fines, lime kiln baghouse dust, lime kiln scrubber solids, calcium carbonate sludge, hydrate ($Ca(OH)_2$), and other waste lime containing streams from sources such as lime plants or paper mills. Generally, where such are used as the neutralizing component, the final fuel composition may contain up to 50% by weight of these materials.

Other waste materials which can be used in the neutralizing component include electric arc furnace dust ("EAFD"), a mixture of $Fe_2O_3$, $ZnO$, $PbO$, $MgO$ and $CaO$, along with some $SiO_2$ and basic oxygen furnace dust ("BOF", a mixture of $Fe_2O_3$, $CaO$ and $SiO_2$). Such furnace dusts provide compounds which combine with metals like Pb and Cr to form stable, non-leachable ceramic complexes. Up to 70 percent of the fuel composition, by weight, may be EAFD.

A low temperature eutectic is formed by a combination of $CaO$ (from the hydrate included in the briquette) and $Fe_2O_3$—$Al_2O_3$. When "red mud" is used the $Al_2O_3$ fraction is higher than with just EAFD, and the NaOH in the red mud further depresses the melting point of the eutectic. The melt complexes any available metal oxide, e.g. PbO, chrome, etc., into a ceramic, which is resistant to water extraction. For example, a mixture of 1 part (by weight) EAFD, 1 part dirt contaminated with 800 ppm PCB oils, 1 part coal fines refuse, 1 part cow manure, and 0.2 parts red mud were mixed and combusted at a temperature of 1250° C. Initially, the PbO from the EAFD was 493 ppm, and the Cr was 78 ppm. After 40 minutes at temperature the PbO extraction from the residual solids was 21 ppm, and the Cr was 6 ppm. After 90 minutes the PbO was 0.6 ppm and the Cr was down to 0.2 ppm.

The heating value component of the invention, in its preferred embodiment, will normally be blast furnace coke breeze or coal fines refuse. These may be obtained as waste from coke production or coal mining since the sizing of such materials makes them of little value to coke and coal producers. Such waste coal or coke streams generally average about 4% by weight sulfur content, and are thus unattracive fuels unless adequate scrubbing equipment is available for the resulting offgas stream. This makes these wastes especially useful as the low cost heating value component of the present invention. Other materials which may be used as the heating value components include waste oils, paints, organic solvents, coal, coke, wood fines, and used tires. In essence, any hydrocarbon containing source which will provide the minimum 200 btu/lb composition can be used.

As another waste feul component, biological wastes may also be used. These would include animal manure, carcasses and sewage treatment sludge. Previously, the use of these wastes has been subject to storage problems. It is known, however, that $Ca(OH)_2$ may be mixed with such wastes, thereby raising the pH to a sufficient level and eliminate biological activity. Thus, these materials are especially appropriate for use in the inventive composition, and storage is not a problem.

It has been found that the composition of the invention provides effective high temperature stabilizing properties where the heating value of the heating value component plus the nuisance waste component provides at least 200 btu/lb of the solid composition. At values less than this, insufficient combustion may occur to achieve the temperatures necessary to obtain satisfactory kiln conditions or to completely neutralize the noxious components of the fuel. 200 bt/lb of material throughput is the lower practical limit of thermal efficiency of a kiln or furnace. Thus, a fuel with less than 200 btu/lb will result in a gradual self-cooling combustion environment. Above this value the high temperature combustion environment in the kiln or furnace can be maintained. As a maximum value the amount of the heating value component is limited only by the total minimum amounts of the neutralizing and waste components which are advantageously used in the composition but will generally be limited to no more than 80% by weight of the composition.

As the nuisance waste component of the inventive composition used oils and lubricants, mixed solvents, water contaminated with PCBs, soil contaminated with PCBs, used tires, wastes from the manufacturers of plastics, resins and adhesives, cleaning solutions, scrubber sludges for painting operations, tailings in oil refining, animal wastes, sanitary sewage sludges, coal tailings, aluminum furnace linings (carbon contaminated with metals), medical wastes (rat and mice carcasses from biological and bio-chemical studies), plating waste liquids, steel mill sludges (mixtures of oil and tar residue with iron, iron ore, and other metal dust or finely divided solids), chemical plant spent cleaning solvents, used rags and paper products from clean-up that are contaminated with hazadous substances and other wastes can be used. The invention is specifically directed to those wastes considered noxious or which are listed and therefore disposal problems for industry. A common disposal problem—soil contaminated with various noxious wastes—can be used at up to 90% by weight of the total fuel composition.

It has been found that many metals which are common components of wastes such as aluminum furnace linings, and which, when present at levels which make the waste subject to strict disposal requirements, can be treated in the inventive process. Tests indicate that chromium, cadmium, berrylium, barium, selenium, lead, copper, nickel, manganese, arsenic, antimony, bismuth, vanadium, and germanium have been successfully retained in the ash residual of the combusted briquette. The primary constituent of the ash residual is a ceramic form of $CaO-SiO_2$—$Al_2O_3$, where the lime was added to the briquette as lime or hydrate, the silica is from red mud or fly ash, and the alumina is from red mud or bauxite. All of the metals are more effectively retained in the matrix as oxides with the exception of selenium, which is more effectively retained as a metal. Composition of the ash residual which promotes retention of the metal oxides is (in decreasing order of effectiveness) a mix of $SiO_2$, $Al_2O_3$, $CaO$, $ZnO$, $Fe_2O_3$, and of marginal benefit is MgO, unless there is significant chrome to be retained. From X-ray diffraction data, and microprobe analysis it is believed that at the temperatures here involved, the metal oxides are complexed with spinels (aluminates and ferrites), and calcium-silicates. The spinels, and combined silicates are relatively insoluble in water, and are not subject to stringent disposal requirements. Mercury is the one metal that has not been successfully retained in experimental tests, probably due to the low boiling point of the metal, and instability of the oxide.

The amount of any given metal (metal oxide) to be captured is limited only by the amount of ash residue into which it must be melted. At high concentrations of the metals there are several recovery processes that are economical. However, test batches were made with as much as 8% PbO and 1% Cd in the total briquette composition. These are combined into non-leachable ceramics where the combined mix of $SiO_2$, $Al_2O_3$, CaO, ZnO, and $Fe_2O_3$ are at least 6 moles to each mole of PbO and Cd.

As a result of the use of the invention in the form of a shaped solid such as a briquette, combustion within for example a lime kiln, occurs as a glowing ember. In such a process, the combustion and therefore kiln temperature may be carefully controlled. This allows reactions to occur within the briquette whereby the hydrate matrix is disassociated to lime, followed by a fluxing melt of compounds such as $CaF_2$ and $CaCl_2$ into CaO and $CaO/SiO_2$. Metals from waste materials which have been incorporated into the briquette composition as part of the waste component are oxidized and combined into fluxed complexes of CaO and MgO, thus forming ceramic complexes which are relatively inert. It has been found, for example, that even metals such as $Cr^{+6}$ are reacted and combined into these complexes. In a similar manner, sulfur is retained as $CaSO_4$ within the calcia matrix.

It is this ability to combine low value waste materials into a valuable fuel source and nevertheless form inert compounds from noxious or nuisance wastes which results in great economic benefit from use of the present invention. In essence, the present invention makes a waste disposal unit out of a kiln or furnace by use of the inventive composition.

The fuel of the invention is most advantageously formed into a shaped solid by combining the liquid and solid waste components in any suitable manner for mixing. The mixture is stirred for a period of time after which it is subjected to the force of a commercial briquetting press. There is no significance to the shape or size of the solid fuel product, and various shapes and sizes can be used, subject only to the requirements listed herein concerning the composition within the solid. It has been found that high initial forming pressures improve the strength of the solid and increase the sulfur and chlorine capture by the residual ash. Pressures of from 1000 psi to 25,000 psi have been successfully used however, an optimum pressure of from 6000 to 8000 psi in the briquetting press has been found. Pressures higher than 8000 psi only marginally add to sulfur or chlorine capture.

Mixtures of materials to form a fuel briquette having good material handling properties cab be made by combining 10 to 40 weight % of a coarse grain constituent, e.g., limestone fines, petroleum coke, and/or hydrate rejects; 10 to 40 weight % of a finer solids material, e.g., coal fines refuse, calcium carbonate sludge, or lime kiln baghouse dust; 5 to 30 weight % of hydrate; and 5 to 15 weight % of liquid which may consist of a mixture of red mud slurry and organic liquids.

Thorough mixing is advantageously used in order to obtain a briquette which will more uniformly contain sulfur and chlorine off gases formed during heating of the briquette.

Sizing of the solid components used in the invention are not critical, but generally the materials are used in the form of dusts or powders. For example, lime fines, hydrate rejects and limestone finess are readily available in the form of a granular material, usually 100% of which will pass a 4 mesh screen. Fluid coke will generally be of similar sizing, although slightly larger particles (50% passing an 8 mesh screen) may still be used. Furnace dust and baghouse dust are normally found as fine powders. In any case, solids which will not pass a ⅜" screen are not desirably used since such a sizing has an adverse affect on the formation and consistency of the briquettes.

The fuel composition of the invention, once formed into a shaped solid such as a briquette or pellet, may be used in a high temperature kiln, such as a lime kiln, which has appropriate features for using such a solid fuel. The fuel is most advantageously used in a lime kiln such as the one disclosed in my previous patent application, Ser. No. 873,170 having features which allow the briquette to be burned as a glowing ember under controlled conditions.

The use of the compositions of the invention at the described conditions has at least two advantages. First, lower fuel costs are achieved. Second, wastes which would otherwise be subject to stringent disposal requirements are converted to relatively inert compounds which are easily disposed of.

While the use of this fuel cannot eliminate the need for off-gas scrubbing equipment, a third advantage arises in installations where alkali scrubbers are used. The sludge formed in such scrubber systems will retain those components which are not captured in the briquette of the invention, and this sludge can be recycled and used as a briquette component. Thus, the scrubber sludge simply becomes another source of waste lime and $Cl_2$—$F_2$/alkali fluxes for the briquetted fuel.

The composition can comprise, consist essentially of or consist of the slated materials and the process can comprise, consist essentially of or consist of the recited steps with such materials.

The following examples are set forth to indicate some of the compositions of the invention and the conditions under which these may be used, but these are not considered to limit the scope of the invention.

EXAMPLES

Compositions were made in order to determine the minimum amount of heating value component which could be used and still achieve sufficient temperatures in use. In making the following composition, the components listed were mixed in a Littleford ribbon blender and the resulting mixture subjected to the pressures indicated using a two roll screw feed briquetting press made by J.R. Komerk, model B-2, Chicago, Ill.

Fuel briquettes were made with the following composition:

| constituent: | weight % |
| --- | --- |
| (a) neutralizing | |
| Limestone fines | 14 |
| Red mud slurry | 12 |
| Lime kiln baghouse dust | 16 |
| (b) heating value and nuisance waste | |
| Blast furnace coke breeze | 25 |

| constituent: | weight % |
| --- | --- |
| Coal fines refuse | 21 |
| Waste oils | 12 |

Waste oils were a combined mix of waste hydrocarbons including oils, solvents, and other chemicals. The mixture contained 5% chlorine (as chlorinated hydrocarbons, e.g., PCB's, etc), plus the metals Pb, Zn, Cd, and Cr (hexavalent).

The mixture of liquids and solids were combined, thoroughly stirred for 6 minutes and then pressed at a pressure of about 3000–5000 psi into briquettes of approximately 120 grams each in a commercial briquetting press. The briquettes had an average net calorific or heating value of 4210 BTU per lb.

The briquettes were placed in a bench scale lime kiln 24" diameter, 17 feet high, and subjected to the time temperature profile that would be encountered in a well designed kiln. By limiting the maximum temperature to about 1200° C. for a period of 200 minutes, the fuel briquettes obtained more than 99% carbon burn-out, with 93% of the total sulfur retained in the residual ash material of the briquette. Approximately 92.6% of the total chlorine was retained in the residual ash material, primarily as a quaternary melt of $NaCl—CaCl_2—CaO—Fe_2O_3$ (determined by x-ray diffraction). The metals were retained as combined oxides in spinels with $Al_2O_3$, $Fe_2O_3$ and CaO (also determined by XRD). Mass balance for the metals indicated 98.9 to 99.6% of the metals remained in the residual ash material.

The ash material was non-toxic by current environmental regulation definitions.

Another test formulation was made with the following composition:

| constituent: | Weight % |
| --- | --- |
| (a) neutralizing | |
| Limestone fines | 4 |
| Red mud slurry | 8 |
| Lime kiln baghouse dust | 50 |
| Electric arc furnance dust | 10 |
| (b) heating value and waste | |
| Petroleum coke fines (fluid coke) | 16 |
| Water based solvents, adhesives and pesticide wastes | 12 |

The liquids and solids were combined and stirred for 1 minute and a second batch of the same composition for 6 minutes and then pressed at a presure of 3000–5000 psi into briquettes of approximately 128 grams each in a commercial briquetting press. The briquettes had an average net heating value of 2340 BTU per lb. From these mixtures it was found that mixing the ingredients thoroughly, and hydrating the lime in the system to $Ca(OH)_2$ is essential to the retention reactions. If the ingredients are unmixed, or poorly mixed, some of the reactions are localized in the briquette. This results in overall poor performance of the briquette system, not only of retention of the metals and metal oxides, but burn-out of the fuel constituent as well.

A total of 143 formulations were made and pressed (at pressures from 1000 to 25,000 psi) into fuel briquettes ranging in size from 14 grams to 843 grams. Sixty-two runs in a bench scale kiln 24" diameter, 17 feet high, were made using different fuel briquette formulations and time-temperature profiles in the kiln. The remaining 81 formulations of fuel briquettes were combusted in part or totally in a small electrically heated laboratory furnace in which the temperature can be controlled by means of a rheostat. Exposure times ranged from 10 to 800 minutes. From these tests the fuel briquettes were found to have the following characteristics.

The optimum peak exposure temperature was approximately 1200° C., with a preferred dwell time of from 45–120 minutes at the peak temperature. Maximum temperatures less than 1150° C. resulted in lower total carbon burn-out, i.e. 93% at 1100° C., 88% at 1000° C., and only 71% at 900° C.

Maximum or peak temperatures above about 1200° C. did not increase the carbon burn-out (99+% at 1200° C.), but the sulfur retention in the ash material dropped rapidly at temperature above about 1250° C., only 18% of the fuel sulfur was retained in the ash material with a peak temperature of about 1340° C. By comparison, this same formulation of fuel briquettes had a 96% sulfur retention at 1190° C.

Destruction of high molecular weight hydrocarbons and chlorinated hydrocarbons in particular also falls off dramatically as the peak temperature is reduced below 1100° C. At peak temperatures of 1210° C. and higher the destruction of chlorinated hydrocarbons to $Cl_2$ and hypochlorite, $OCl—$, was determined by GCMS to be 99.99%. The decomposed and oxidized chlorinated hydrocarbons yield chlorine compounds incorporated in the ash material or which combine with sodium and calcium in the kiln exhaust scrubber.

Pressures of less than 1000 psi were found to produce inadequate structural integrity, and pressures of from 6000–8000 psi resulted in the most efficient capture of sulfur, chlorine and fluorine, i.e., higher pressures of up to 25,000 psi increase capture only marginally, but require much greater work.

The calcium materials, which if in the form of lime, lime kiln baghouse dust, hydrate, or hydrate rejects must be thoroughly mixed with the fuel materials. Inadequate mixing results in poor sulfur/chlorine capture by the residual ash.

A third formulation that was tested had the following composition:

| constituent: | weight % |
| --- | --- |
| (a) neutralizing | |
| Limestone fines | 10 |
| Electric arc furnance dust | 15 |
| Lime kiln baghouse dust | 30 |
| (b) heating value | |
| Coal fines refuse | 20 |
| (c) nuisance waste | |
| Water contaminated with PCB oil | 10 |
| Soil contaminated with PCB oil | 15 |

The mixture of materials was stirred for 6 minutes and then pressed into briquettes having an average weight of 123 grams each in a commercial briquetting press. Pressures of 3000–5000 psi were used. The briquettes had an average heating value of 445 Btu/lbs.

A maximum temperature of 1220° C. was obtained in the 1 hour dwell zone of the 24" diameter by 17 feet high bench scale kiln by using a higher fuel briquette to limestone ratios than had been used in the other tests with fuel briquettes having higher heating values.

The processing temperature profile in a kiln can be controlled by any combination of fuel briquettes/limestone, and/or heating value of the fuel briquette. If the desired briquettes have a low net heating value, more of the fuel briquettes relative to the limestone charge in the kiln are used; conversely, if the fuel briquettes have a high net heating value than fewer, relative to the limestone charge, are used in the lime kiln.

What is claimed is:

1. A method of selectively capturing nuisance chemical components within the residual ash of a combusted mixture of waste compounds, said method comprising the steps of:

(a) forming a combustible mixture from:
  (i) a nuisance waste component, which nuisance waste contains a material including at least one of the group consisting of lead, chromium, manganese, cadmium, beryllium, barium, selenium, arsenic, vanadium, antimony, bismuth, strontium, zirzonium, germanium, copper, nickel, zinc, aluminum, sulfur, hydrocarbons, biological wastes and mixtures thereof;
  (ii) a heating value component; and
  (iii) a neutralizing component consisting of the oxides, hydroxides and carbonates of calcium, magnesium, and sodium, and at least one of $SiO_2$, $Al_2O_3$, $Fe_2O_3$, ZnO and mixtures thereof;

(b) pressing said combustible mixture at a pressure sufficient to form a structurally stable solid having a net heating value of at least 200 btu/lb of said solid; and (c) converting said nuisance waste components to compounds resistant to water extraction by burning said combustible mixture, said neutralizing component being selected to cause said nuisance components to form said compounds resistant to water extraction.

2. The method of claim 1 wherein said combustible mixture is pressed at a pressure of from 1000 to 20,000 p.s.i.

3. The method of claim 1 wherein said combustible mixture is burned at a temperature of from about 1150° C. to about 1300° C.

4. The method of claim 3 wherein said combustible mixture is burned for at least 30 minutes.

5. A combustible mixture comprising:
  (1) a nuisance waste component, which nuisance waste component contains a material including at least one of the group consisting of lead, chromium, manganese, cadmium, beryllium, barium, selenium, arsenic, vanadium, antimony, bismuth, strontium, zirconium, germanium, copper, nickel, zinc, aluminum, sulfur, hydrocarbons, biological wastes, and mixtures thereof;
  (2) a heating value component; and
  (3) a neutralizing component consisting of oxides, hydroxides and carbonates of calcium, magnesium, and sodium, and at least one of $SiO_2$, $Al_2O_3$, $Fe_2O_3$, ZnO and mixtures thereof;
wherein said neutralizing component is present in sufficient quantity to cause said nuisance waste component to form compounds resistant to water extraction upon combustion of said combustible mixture.

6. A composition as in claim 5 wherein said nuisance waste component comprises a fluorine or chlorine containing hydrocarbon.

7. A composition as in claim 5 wherein the neutralizing component comprises one or more of said calcium, magnesium and sodium compounds, and the combined molar ratio of any of calcium, magnesium and sodium in the neutralizing component to any of sulfur, chlorine and fluorine present in the composition is 2:1 or greater.

8. The composition of claim 5 wherein the heating value component comprises oil, paint, organic solvent, coke breeze, coal, coal fines refuse, biological wastes, used tires, wood fines or mixtures thereof.

9. A composition as in claim 5, wherein said nuisance waste component contains lead, chromium, cadmium, sulfur and chlorine contaminants and wherein said neutralizing component consists of red mud in an amount of from 1–20% by weight of the total composition.

* * * * *